United States Patent [19]

Mizuhara et al.

[11] 3,944,475
[45] Mar. 16, 1976

[54] ELECTROLYTIC GRINDING METHOD

[75] Inventors: Yasushi Mizuhara, Kamakura; Tsuwao Abe; Hiroyuki Hitomi, both of Kawasaki, all of Japan

[73] Assignee: Hitachi Seiko Ltd., Japan

[22] Filed: Jan. 26, 1973

[21] Appl. No.: 326,843

[52] U.S. Cl. ............................................. 204/129.46
[51] Int. Cl.² .................................................. B23P 1/10
[58] Field of Search .............................. 204/129.46

[56] References Cited
UNITED STATES PATENTS

| | | | |
|---|---|---|---|
| 3,043,766 | 7/1962 | Williams | 204/129.46 |
| 3,285,843 | 11/1966 | Blake | 204/129.46 |
| 3,442,784 | 5/1969 | Wieck | 204/129.46 |
| 3,476,662 | 11/1969 | Inoue | 204/129.46 |

*Primary Examiner*—T. Tung
*Attorney, Agent, or Firm*—Craig & Antonelli

[57] ABSTRACT

A method of electrolytically grinding a workpiece into a desired cylindrical shape by applying a voltage across a grinding wheel rotating at a high speed and a workpiece rotating at a low speed, and supplying an electrolyte between said grinding wheel and workpiece, wherein said workpiece is fed in a tangential direction of said grinding wheel and concurrently rotated at a low speed, and said grinding wheel and workpiece at the outset of the grinding operation are set in such a positional relation that the tangential lines of said grinding wheel and workpiece, extending parallel to the feeding direction of the workpiece and closer to said workpiece and grinding wheel respectively, are located beyond each other with respect to the centers of said grinding wheel and workpiece respectively and spaced from each other by a distance just equal to the desired depth to be cut off of the workpiece.

5 Claims, 2 Drawing Figures

ELECTROLYTIC GRINDING METHOD

BACKGROUND OF THE INVENTION

This invention relates to a method of grinding a workpiece into a cylindrical shape while taking advantage of electrolytic action.

In a conventional method of grinding a workpiece into a cylindrical shape, utilizing electrolytic action, or a so-called electrolytic grinding method, as shown in FIG. 1, it has been customary to grind the surface layer of a workpiece 2 to a predetermined depth of $t$ by feeding the non-rotating workpiece toward the center of rotation of a grinding wheel 1 rotating at a high speed to the depth $t$, and then rotate the workpiece 2 one revolution at a low speed, so as to grind the surface layer of the workpiece to the predetermined depth $t$, whereby said workpiece 2 is ground into a desired cylindrical shape. In FIG. 1, reference numeral 5 designates an electrolyte supply nozzle and 6 designates a power source for the electrolysis.

However, the conventional method described above has had the disadvantage that, since the electrolytic grinding is terminated, with the center of the workpiece 2 in the position of its stroke closest to the center of rotation of the grinding wheel 2 and with said workpiece in contact with said grinding wheel, a land is formed by re-electrolysis at the portion of the workpiece where the electrolytic grinding was terminated or started, which degrades remarkably the circularity of the finished workpiece.

This disadvantage in the above described electrolytic grinding method occurs since the described workpiece 2 is fed toward the center of rotation of the grinding wheel 1 without rotation of the workpiece, and thereafter when the depth of cut becomes $t$, the ground depth of the workpiece at an initial grinding portion thereof is larger than that of the peripheral surface of the workpiece 2 in the electrolytic grinding thereof during one rotation of the workpiece. Thus, a concaved surface portion is formed at the peripheral surface of the workpiece where the grinding was started. Also, when the workpiece 2 is rotated one revolution and electric current is stopped, the portion at which rotation of the workpiece 2 is terminated corresponds to the starting portion of rotation, and the concaved surface portion of the workpiece is enlarged by re-electrolysis at this portion of the workpiece, which further degrades the circularity of the finished workpiece, thus, conventionally, this concaved surface portion of the workpiece 2 must be removed by mechanically regrinding the same, after the electrolytic grinding is terminated. However, as apparent from the Table described below, a comparison of the above described conventional process with the process of the invention shows that the working performance is low in the conventional process and the circularity is only of 0.026 mm at the utmost in the conventional process, as compared to a circularity of 0.0026 mm in the workpiece ground according to the present invention.

SUMMARY OF THE INVENTION

It is the primary object of the present invention to overcome such disadvantage of the conventional electrolytic grinding method.

The electrolytic grinding method according to the invention comprises applying a voltage across a grinding wheel rotating at a high speed and a workpiece rotating at a low speed, supplying an electrolyte between said grinding wheel and said workpiece, and feeding said workpiece in a tangential direction of said grinding wheel while rotating it at the low speed, the positional relation of said grinding wheel and workpiece being such that the tangential lines of said grinding wheel and workpiece, extending in the feeding direction of the workpiece are located beyond each other with respect to the centers thereof and are spaced from each other by a distance just equal to the desired depth of grinding, whereby said workpiece is ground into a cylindrical shape. In this process, the rotating grinding wheel is located in a position extending in the feeding direction of said workpiece so as to remove a portion to be cut off (finishing allowance) of the outer peripheral surface of the workpiece and the workpiece is fed in a tangential direction of the outer periphery (parallel to the feeding direction of the workpiece) of the rotating grinding wheel.

According to the electrolytic grinding method of the invention, therefore, the workpiece moves slowly toward the grinding wheel rotating at a fixed position and, after being ground in a predetermined depth, again moves slowly at a predetermined speed away from the grinding wheel, so that a land is not formed on the finished surface of the workpiece at the location where the grinding was terminated or started and the circularity of the finished workpiece can be increased to the order of 2 – 3 microns.

DESCRIPTION OF THE PREFERRED EMBODIMENT

Figure 2:
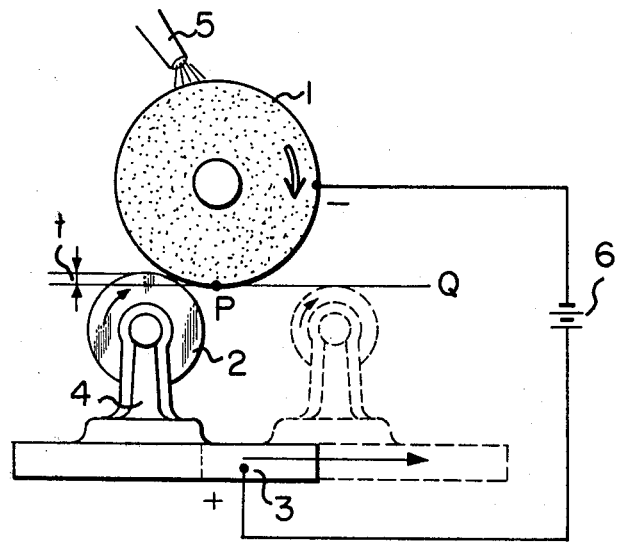
FIG. 2 is a diagram illustrating the electrolytic grinding method according to the invention.

In FIG. 2, reference numeral 1 designates a grinding wheel and 2 designates a workpiece. The workpiece 2 is rotatably supported on a support bed 4. The support bed 4 is fixedly mounted on a table 3 which is movable on a bed of the electrolytic grinding machine (not shown) at a predetermined speed, normally in a horizontal direction (the direction of the arrow). The grinding wheel 1 during working is driven at a high speed in a fixed position on the electrolytic grinding machine.

Reference numeral 6 designates a power source, the (+) side of which is connected to the workpiece 2 and the (−) side of which to the grinding wheel, and 5 designates an electrolyte supply nozzle.

In practicing the method of this invention by the setup briefly described above, a tangential line ($\overline{PQ}$) of the grinding wheel 1, passing an optional point P on the outer periphery of said grinding wheel, is set, and the workpiece 2 supported on the support bed 4 is fed by moving the table 3 from one to the other side of the grinding wheel in a direction (indicated by the arrow) parallel to said tangential line ($\overline{PQ}$). In this case, the grinding wheel 1 is driven at a high speed and the workpiece 2 at a speed considerably lower than the speed of said grinding wheel, both in a clockwise direction as viewed in FIG. 2. The grinding wheel 1 and workpiece 2 are disposed vertically such that the tangential line ($\overline{PQ}$) and the tangential line of the workpiece parallel to said tangential line ($\overline{PQ}$) are located beyond each other with respect to the outer surfaces of said grinding wheel and workpiece respectively and are spaced from each other by a distance just equal to the desired depth *t* to be cut off, as shown.

A current is constantly supplied from the power source 6 to the grinding wheel 1 and workpiece 2, and an electrolyte is constantly supplied from the electrolyte supply nozzle 5 to the engaging portions of the grinding wheel and workpiece, throughout the grinding operation.

The electrolytic grinding is terminated when the workpiece 2 being fed at a relatively low speed in a direction parallel to the tangential line (PQ) has reached near the position indicated by the dotted line in FIG. 2.

Figure 1:
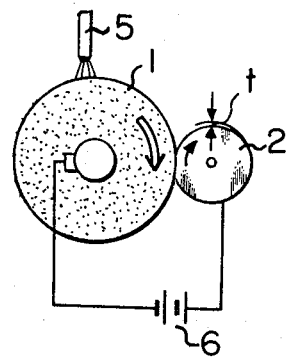
FIG. 1 is a diagram illustrating the essential portion of a setup for practicing the conventional electrolytic grinding method.

We have actually carried out the conventional electrolytic grinding method illustrated in FIG. 1 and the electrolytic grinding method of the invention illustrated in FIG. 2, with the results which are shown in comparison in the table given below:

| Item | Conventional method | Subject method |
|---|---|---|
| Material of workpiece | Super-hard alloy | Super-hard alloy |
| Diameter of workpiece | 157 mm | 157 mm |
| Speed of grinding wheel | 3,000 r.p.m. | 2,500 r.p.m. |
| Speed of workpiece | 20 r.p.m. | 1.5 r.p.m. |
| Feeding rate | 0.013 mm/min | 0.57 mm/min |
| Grinding period | 90 min. | 30 min. |
| Circularity of finished workpiece | 0.026 mm | 0.0026 mm |

According to the method of this invention, as described above, the electrolytic grinding is achieved while the workpiece is moving slowly toward the grinding wheel and moving slowly away therefrom. Thus, the grinding method is accomplished so that the rotating workpiece is fed along a line parallel to the tangential line of the outer peripheral surface of the rotating grinding wheel, enabling contact of the rotating grinding wheel with the rotating workpiece while both are rotating and the workpiece is moving relative to the grinding wheel such that lands or concavities are not formed in the peripheral surface of the workpiece. And in addition thereto, the electrolytic grinding is carried out with continuous rotation of the workpiece during the time from the start to the end of the grinding operation. Therefore, the formation of a land by re-electrolysis at about the grinding terminating or grinding starting portion of the workpiece can be avoided and the circularity of the finished workpiece can be increased to about 2–3 microns.

It will also be seen from the above experimental results that according to the invention, the period required for grinding can be shortened drastically as compared with the conventional method, and further, the grinding speed itself can be increased.

We claim:

1. In an electrolytic grinding method including the steps of continuously rotating a grinding wheel and a cylindrical workpiece, feeding the cylindrical workpiece to be in engaging relation with the grinding wheel, applying a voltage between said cylindrical workpiece and said grinding wheel, and supplying an electrolyte between said cylindrical workpiece and said grinding wheel to effect electrolytic grinding of said cylindrical workpiece, the improvement comprising the steps of:

mounting said cylindrical workpiece prior to said step of feeding at a positional relation to said grinding wheel such that the tangential lines to said workpiece and said grinding wheel extending in the feeding direction of said workpiece and closer to said grinding wheel and workpiece respectively are spaced with respect to each other towards the centers of said grinding wheel and workpiece respectively at a distance corresponding to a predetermined depth to be cut-off of said workpiece, and electrolytically grinding with said grinding wheel the entire outer peripheral surface of said rotating cylindrical workpiece to said predetermined depth by feeding said rotating cylindrical workpiece along said feeding direction parallel to said tangential lines.

2. An electrolytic grinding method according to claim 1, wherein said step of feeding includes moving said rotating cylindrical workpiece past said grinding wheel along said direction parallel to said tangential lines after the electrolytic grinding of said rotating cylindrical workpiece to said predetermined depth has been effected.

3. An electrolytic grinding method according to claim 1, wherein said grinding wheel electrolytically grinds said rotating cylindrical workpiece to a circularity of the order of 2 – 3 microns.

4. An electrolytic grinding method according to claim 1, wherein said grinding wheel is rotated at a substantially greater rotational speed than said cylindrical workpiece.

5. An electrolytic grinding method according to claim 4, wherein said grinding wheel and said cylindrical workpiece are rotated in the same direction.

\* \* \* \* \*